United States Patent [19]

Godfrey

[11] Patent Number: 5,293,304
[45] Date of Patent: Mar. 8, 1994

[54] DUAL MODE ANTICOLLISION/RECOGNITION LAMP FOR AIRCRAFT

[75] Inventor: George W. Godfrey, Pinellas County, Fla.

[73] Assignee: Godfrey Engineering, Oldsmar, Fla.

[21] Appl. No.: 895,483

[22] Filed: Jun. 8, 1992

[51] Int. Cl.⁵ .............................................. B64D 47/04
[52] U.S. Cl. ....................................... 362/62; 362/240; 362/251; 362/276; 340/981; 315/84.61; 315/315
[58] Field of Search ............... 362/62, 227, 231, 240, 362/241, 251, 276; 340/961, 981, 971; 315/209 R, 185 R, 312, 314, 315

[56] References Cited

U.S. PATENT DOCUMENTS

| | | | |
|---|---|---|---|
| 3,619,597 | 11/1971 | Adler | 362/227 |
| 3,676,736 | 7/1972 | Starer | 362/62 |
| 4,011,541 | 3/1977 | Fabry et al. | 340/981 |
| 4,185,232 | 1/1980 | Ingalls et al. | 340/981 |
| 4,233,652 | 11/1980 | Oswald | 362/62 |
| 4,346,430 | 8/1982 | Holland | 362/62 |
| 4,554,544 | 11/1985 | Task | 362/62 |
| 5,136,481 | 8/1992 | Dietzsch et al. | 362/62 |

Primary Examiner—Richard R. Cole
Assistant Examiner—L. Heyman
Attorney, Agent, or Firm—William E. Zitelli; Richard A. Romanchik

[57] ABSTRACT

A dual mode exterior lamp for an aircraft includes a higher intensity anticollision light, a lower intensity recognition light, a power supply for the lights, and means for activating the anticollision light when the aircraft is airborne and for activating the recognition light when the aircraft is on the ground. In the preferred embodiment the activating means is responsive to a landing gear position switch.

26 Claims, 5 Drawing Sheets

FROM FIG. 3A

DUAL MODE ANTICOLLISION/RECOGNITION LAMP FOR AIRCRAFT

BACKGROUND OF THE INVENTION

The invention relates generally to aircraft lighting systems. More particularly, the invention relates to anticollision lights used on aircraft exteriors.

Until recently, regulations for the airline industry required operational exterior lamps for all airborne aircraft as an anticollision safety factor. These same lights are used when aircraft are on the ground. Typically these lights are mounted on the fuselage, tail and/or wings and so on. The required illumination heretofore was 100 candela. However, the intensity requirement has now been raised to 400 candela for airborne aircraft. It is expected that although 400 candela lights are available, this brightness will be unacceptable for ground operations. Therefore, a new lighting system is needed for aircraft that will meet the airborne illumination requirements without unduly interfering with ground operations. The system should provide a self-contained unit and operate automatically if so needed to reduce tasks for the pilot or crew.

SUMMARY OF THE INVENTION

The present invention, in a preferred embodiment, contemplates an exterior light system for aircraft such as, for example, an airplane comprising first and second lamp means, the first lamp means being activated when the aircraft is airborne and the second lamp means being activated when the aircraft is on the ground; switching means for indicating when the aircraft is airborne and when the aircraft is on the ground; and means for selectively activating the first and second lamp means in response to the switching means.

The invention further contemplates a preferred dual mode exterior lamp for an aircraft comprising first and second lights, each of the lights being positioned on a respective reflector; the reflectors being axially aligned within a common housing; and means for selectively activating one of the lights when the craft is airborne and the other of said lights when the craft is on the ground.

The invention also contemplates the methods of use associated with the aforementioned system and lamp, and furthermore, a method for providing safety lighting on an aircraft exterior comprising the steps of:

a) supplying power to a dual mode lamp;
b) selectively emitting light from an anticollision light when the aircraft is airborne;
c) selectively emitting light from a recognition light when the aircraft is on the ground; and
d) performing steps a), b), and c) in response to detecting when the aircraft is airborne and when the aircraft is on the ground by producing a signal indicative thereof.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in view of the drawings.

DESCRIPTION OF THE PREFERRED EMBODIMENT

Figure 1:
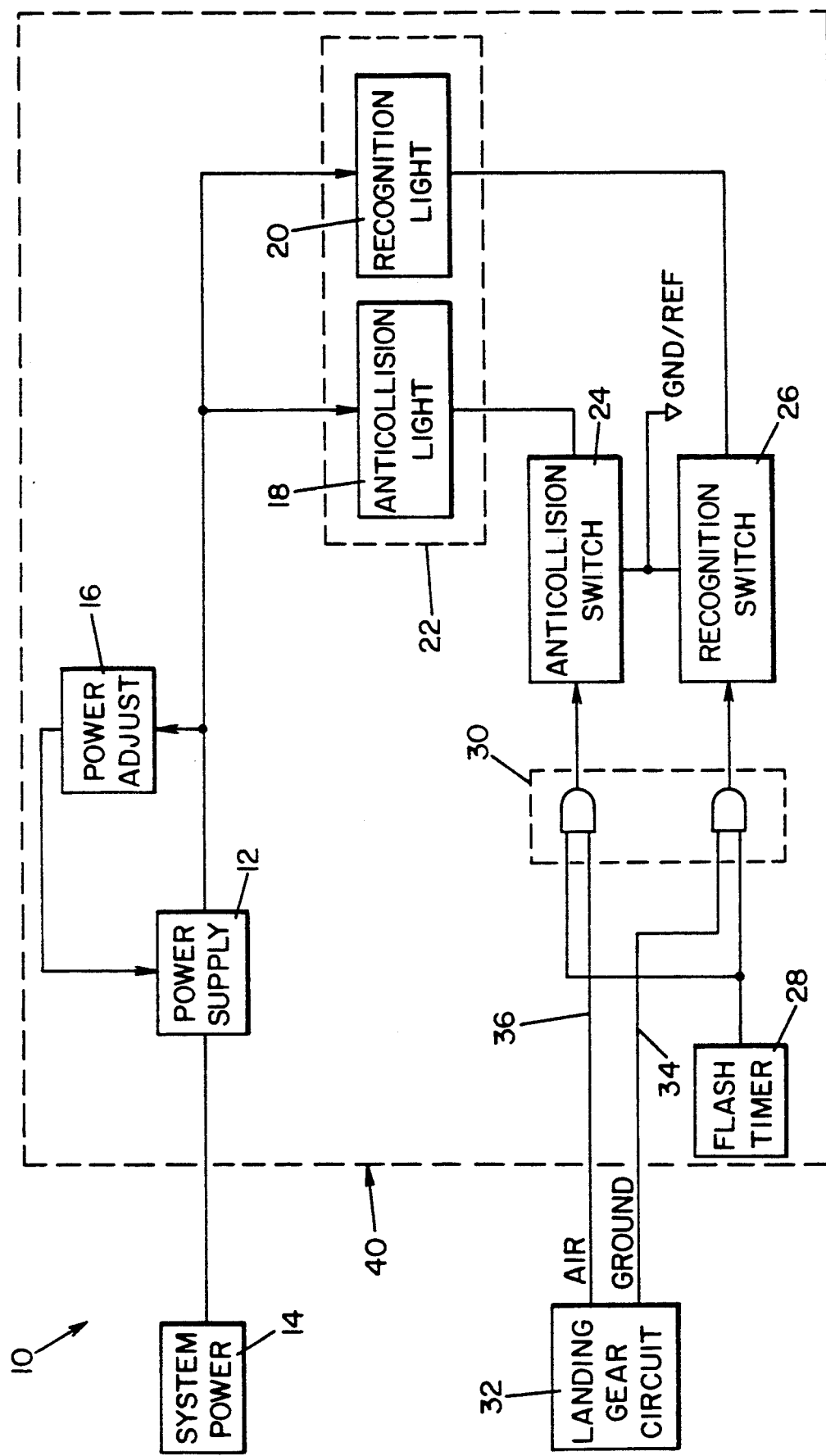
FIG. 1 is an electrical schematic in block diagram form of an exterior lighting system for an aircraft according to the present invention.

With reference to FIG. 1, the preferred embodiment of an electrical lighting system according to the present invention is generally indicated with the numeral 10. While the invention is described herein with specific reference to a lighting system for aircraft, and more particularly an airplane, this is for purposes of explanation only and should not be construed in a limiting sense. Anyone skilled in the art will readily appreciate that the advantages and improvements of the invention as explained herein can be realized with virtually any aircraft wherein there is a need for exterior safety lights for anticollision and/or identification purposes. The invention is particularly suited for airplanes subject to new regulations requiring at least 400 candela illumination whenever the aircraft is airborne. The invention is also particularly useful for aircraft needing a dual mode exterior lamp.

The preferred lighting system 10 includes a self-contained power supply 12 that operates from main system power 14 of the aircraft. A system power regulation and adjustment circuit 16 can be provided for regulating the power applied to a pair of lights 18,20. As suggested by the dotted box 22, the lights 18,20 are preferably mounted in a common housing, as will be described in detail hereinafter.

The first light 18 is hereinafter referred to as an "anticollision" light as it is used during airborne operation of the aircraft; and the second light 20 is hereinafter referred to as a "recognition" light as it is used during ground operations for visual sighting of the aircraft. However, as will be further explained herein, the recognition light can also be operated in an alternating manner with the anticollision light during airborne operation if so desired.

The lighting system 10 preferably meets recent regulations that require during airborne operation that an aircraft must use anticollision lights that operate at an effective intensity of at least 400 candela although the selected intensities of the anticollision and recognition lights is a matter of design choice, the invention being suitable for use with any combination of light intensities. The anticollision light 18 can radiate white light. However, such light intensity is undesirable for ground operations. Accordingly, the lighting system 10 includes the recognition lamp 20, which is preferably designed to operate at a much lower intensity under 400 candela, such as, for example, 100 candela. In the described example herein, the recognition light is designed to radiate white light of at least 400 candela, but is also used in combination with a colored filter, such as a red filter. The red filter reduces the effective intensity by about 75 percent, and thus is suitable for ground operations. Alternatively, lower intensity of the recognition light can be realized by reducing the applied power to the light compared to the anticollision light.

A significant aspect of the invention is that it provides a preferably automatic changeover between activation of the anticollision light and activation of the recognition light in dependence on whether the aircraft is airborne or on the ground. Accordingly, the system 10 includes a pair of switching circuits 24,26 that are used to select which light 18,20 is activated. Thus, anticollision switch circuit 24 is used to activate the anticollision light 18 and the recognition switch circuit 26 is used to activate the recognition light 20. As shown in FIG. 1, the power supply 12 provides power to the lights 18,20 and the switching circuits 24,26 operate to connect reference potential to its respective light when such light is selected for activation. Alternatively, of course, the switching circuits could be used to connect high side power to the lights 18, 20.

The system 10 further includes an optional flash timer circuit 28 used to pulse the lights on and off at a selectable rate, such as fifty flashes per minute or other suitable rate. A logic circuit 30 is provided to control selection of the lights 18,20 for activation as a function of a control signal preferably received from a landing gear position switch 32. In the preferred embodiment, the landing gear switch is a conventional device and is presently used on many aircraft. The landing gear position switch 32 produces an output signal in response to the plane load on the landing gear, such as a strut. Thus, when the aircraft is on the ground the switch 32 is in one position and produces a corresponding ground output 34. As the aircraft becomes airborne, the plane load is removed from the landing gear and the switch 32 produces an airborne output 36. The schematic of FIG. 1 represents these outputs as being two discreet signals, but those skilled in the art will readily appreciate that a single bipolar signal could be used from the switch 32. Those skilled in the art will appreciate that other switch controls could be used for airborne/ground indication such as an altimeter-based system. Of course, the airborne/ground switch indication could be manual, but this is less preferable because it does not reduce tasks performed by the flight crew.

In operation, when the aircraft is airborne the landing gear position switch 32 produces an airborne output 36 that enables the logic circuit 30 to connect the flash timer 28 pulses to the anticollision switch circuit 24 that in turn causes the anticollision light 18 to flash at the flash timer rate. When the aircraft is on the ground, the landing gear position switch 32 produces a ground output 34 that enables the logic circuit 30 to connect the flash timer 28 pulses to the recognition switch circuit 26 that in turn causes the recognition light 20 to flash at the flash timer rate. Thus, the invention provides a dual mode lamp that exhibits a high intensity light when the aircraft is airborne, and a second lower intensity light when the aircraft is on the ground. The lamp can switch modes automatically in response to a signal that indicates whether the aircraft is airborne or on the ground.

In the preferred embodiment, the anticollision light 18 and recognition light 20 operate in a mutually exclusive manner with respect to each other; that is, when the anticollision light 18 is flashing the recognition light is off, and when the recognition light is flashing the anticollision light is off. Of course, if desired the system 10 can be easily adapted to permit the anticollision light 18 and the recognition light 20 to be alternatingly flashed while the plane is airborne, or even when the plane is on the ground, although the latter scenario is less preferred because of the higher intensity of the anticollision light. Anyone skilled in the art will also readily appreciate that the flash rates can be selected as desired, and that the anticollision light and recognition light could be operated at different flash rates if desired. These alternatives are less preferred at this time only because such options add to the complexity of the control circuitry.

Still referring to FIG. 1, it is preferred that all of the system 10 components be contained in a single lamp assembly 40, except, of course, the landing gear switch 32 and the system power 14. Thus, the system 10 can be realized with a self-contained lamp assembly 40 that simply has three inputs: system power (such as +28 volts DC), an electrical ground or reference potential, and the landing gear position switch 32 output signal.

Figure 2:
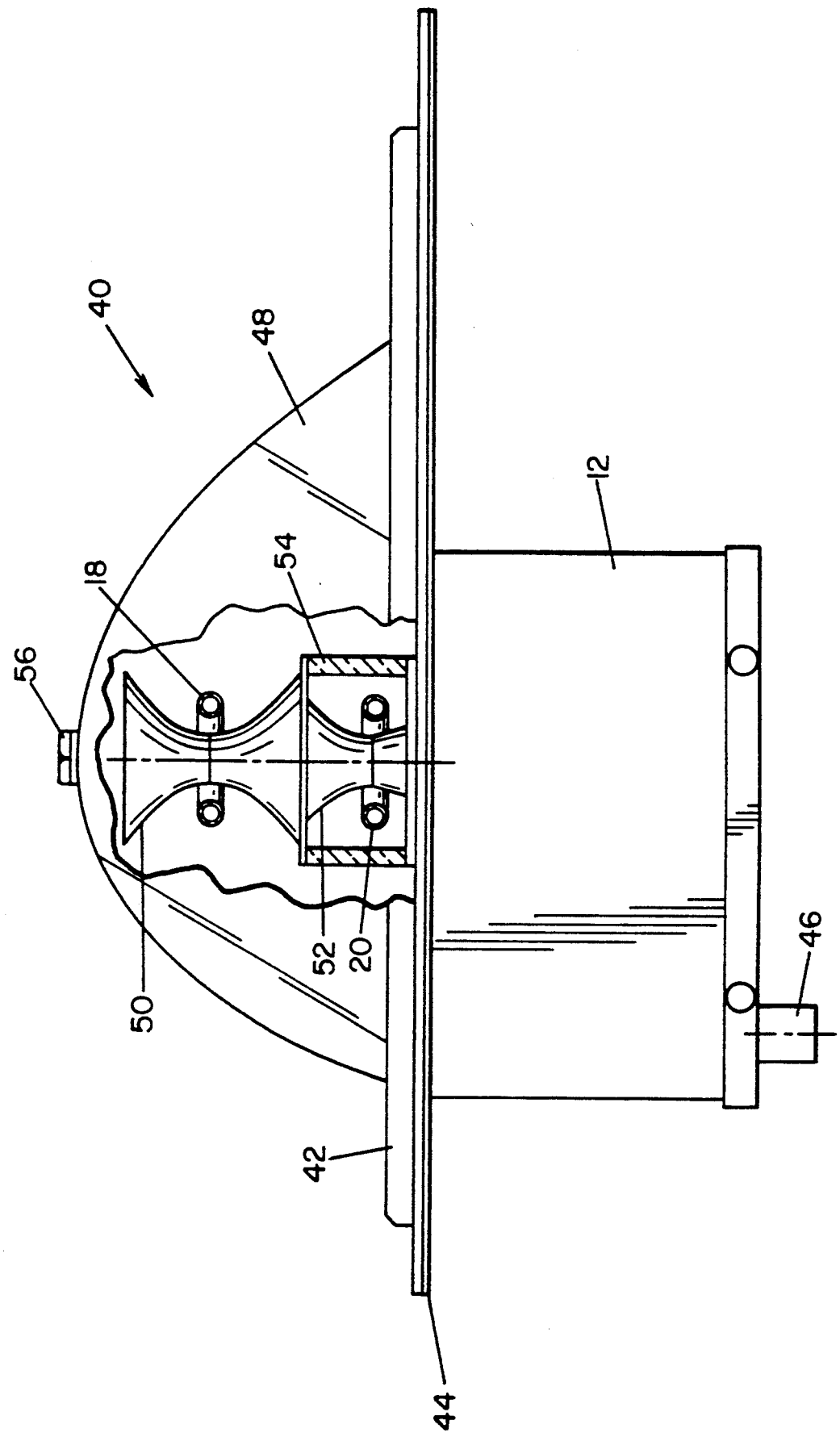
FIG. 2 is a schematic drawing in elevation of a dual mode lamp according to the present invention, in partial section to illustrate structural features of the light producing components.

With reference to FIG. 2, a preferred configuration for a self-contained dual mode lamp assembly 40 is illustrated. Such a lamp assembly 40 includes the power supply 12 attached to a bezel plate 42. One or more gaskets 44 may be provided as needed. The power supply 12 includes an electrical connector 46 having terminals for inputting the system power, reference and landing gear position switch output to the lamp electronics. The lamp assembly 40 further includes a clear lens 48 that encloses the anticollision light 18 and the recognition light 20. Each light is preferably a conventional flash tube light emitting at least 400 candela. Each light 18,20 is positioned at the focal point of a respective capstan reflector 50,52. The capstan-type reflector is preferred as it can be used to achieve 360° illumination and is effective for concentrating the light. However, for aircraft that use a plurality of such dual mode lamps, the reflectors can be of other types such as half-capstan (for 180° each) or parabolic. The type reflector used will depend on the aircraft and number of lamps to be used. Alternatively, lenses could be used instead of reflectors. Preferably, the capstan reflectors 50,52 are axially aligned and attached end to end by any convenient means (not shown). The recognition light capstan 52 is further provided with a color filter 54, preferably a red filter. The lens 48 may also be provided with an optional drain plug 56.

Figure 3A:
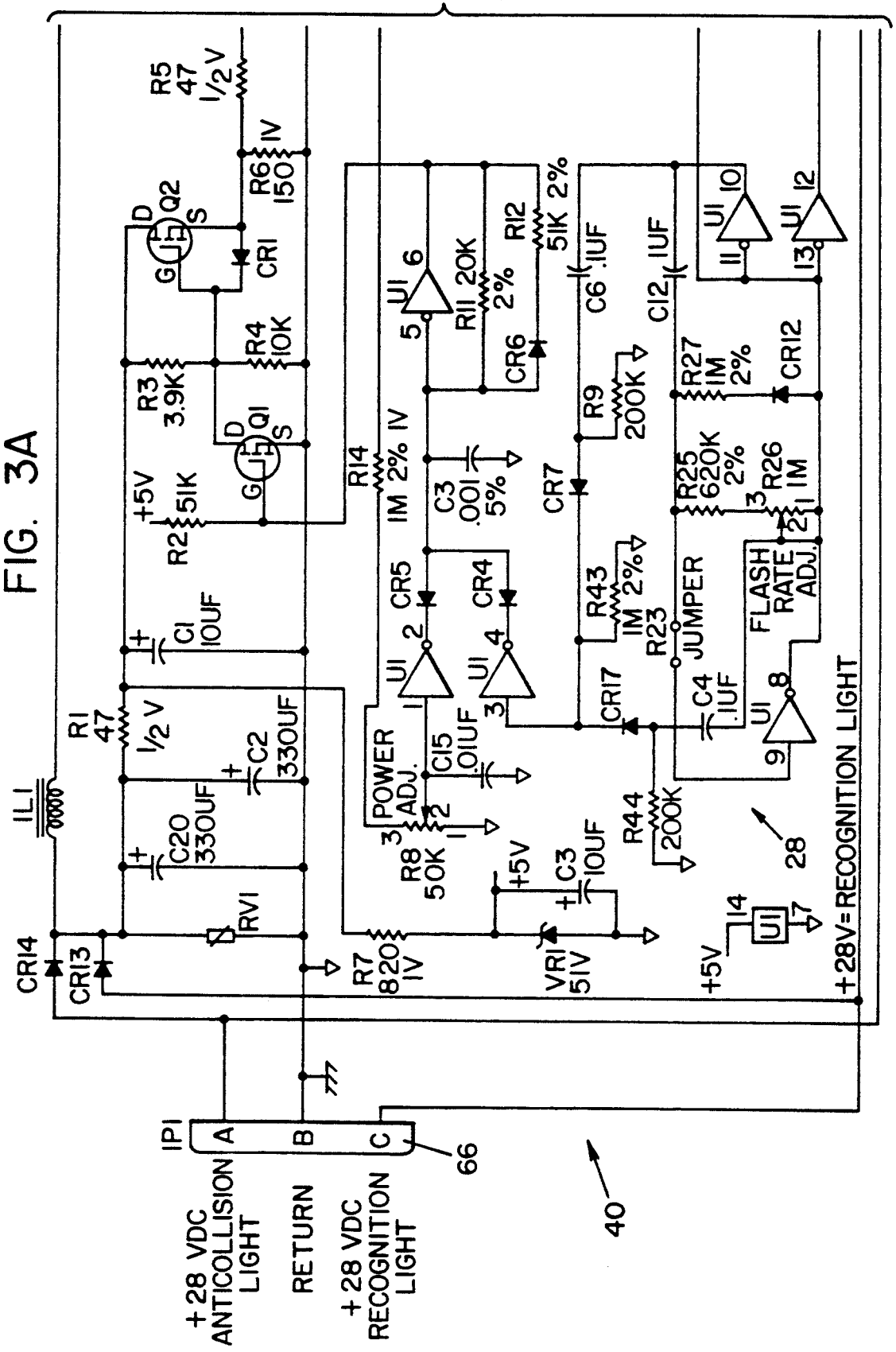
FIG. 3A is a detailed electrical schematic of a portion of a preferred circuit for use with the present invention.
Figure 3B:
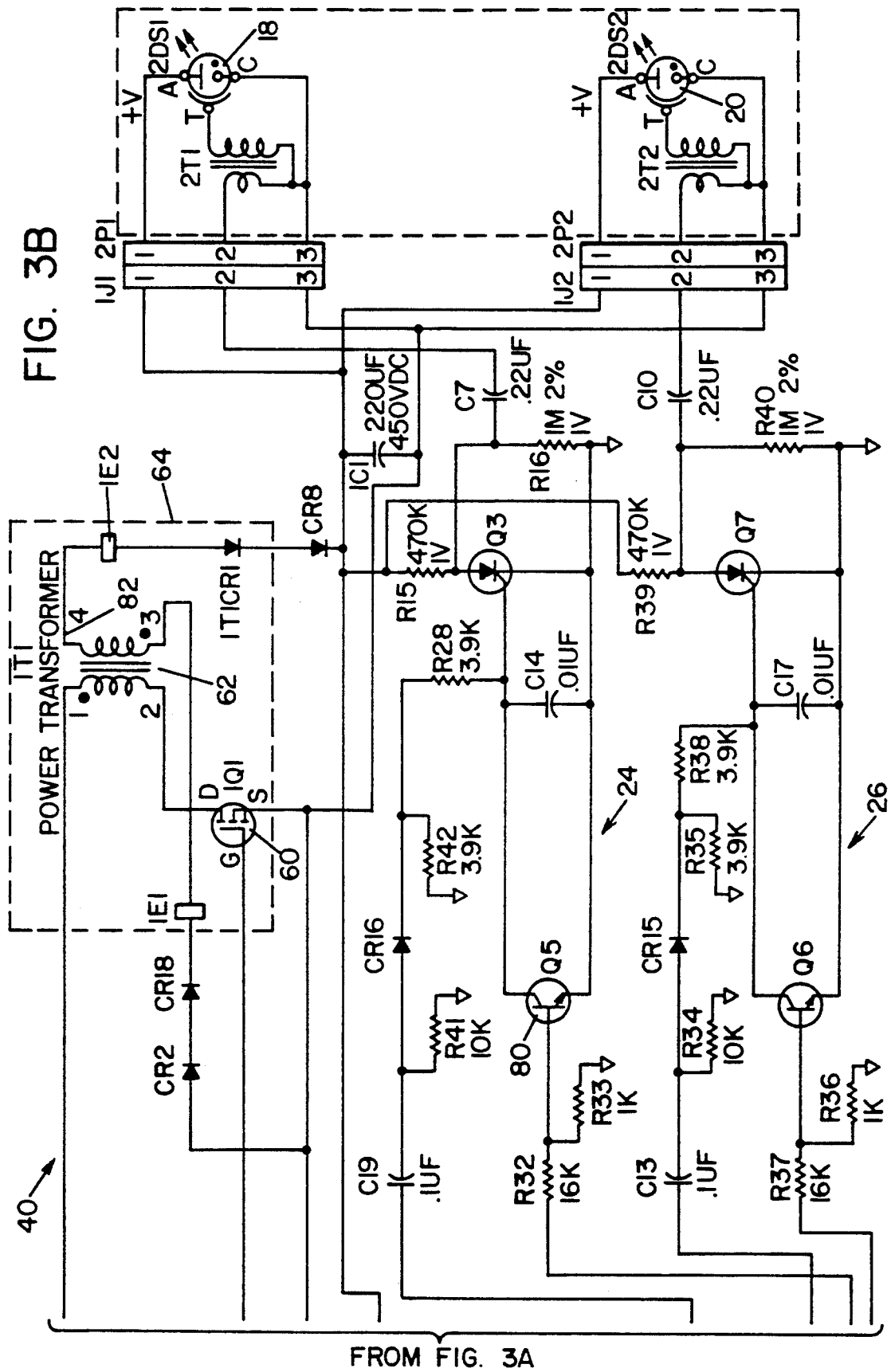
FIG. 3B is a detailed electrical schematic of the remaining portion of the circuit illustrated in FIG. 3A.

With reference next to FIGS. 3A, 3B, a preferred circuit for realizing system 10 of FIG. 1 is illustrated with suitable component values included on the drawing. In this circuit, the power supply 12 is realized by a DC inverter of conventional design comprising switching transistor 60 (1Q1), power transformer 62 (1T1) and related circuitry generally, but not entirely, outlined by box 64. The inverter operates from the +28 VDC main system power supply and return as provided through the external connector 66 (1P1). The power supply 12 preferably operates to produce about 220 VDC output at a node 82 which is in turn connected to the high voltage side of the lights 18,20 as well as the high voltage side of SCR switches Q3 and Q7. Of course, the power supply output will be designed as required dependent on the flash tube used, intensity requirements, main storage capacitor characteristics, and so on.

Figure 4:
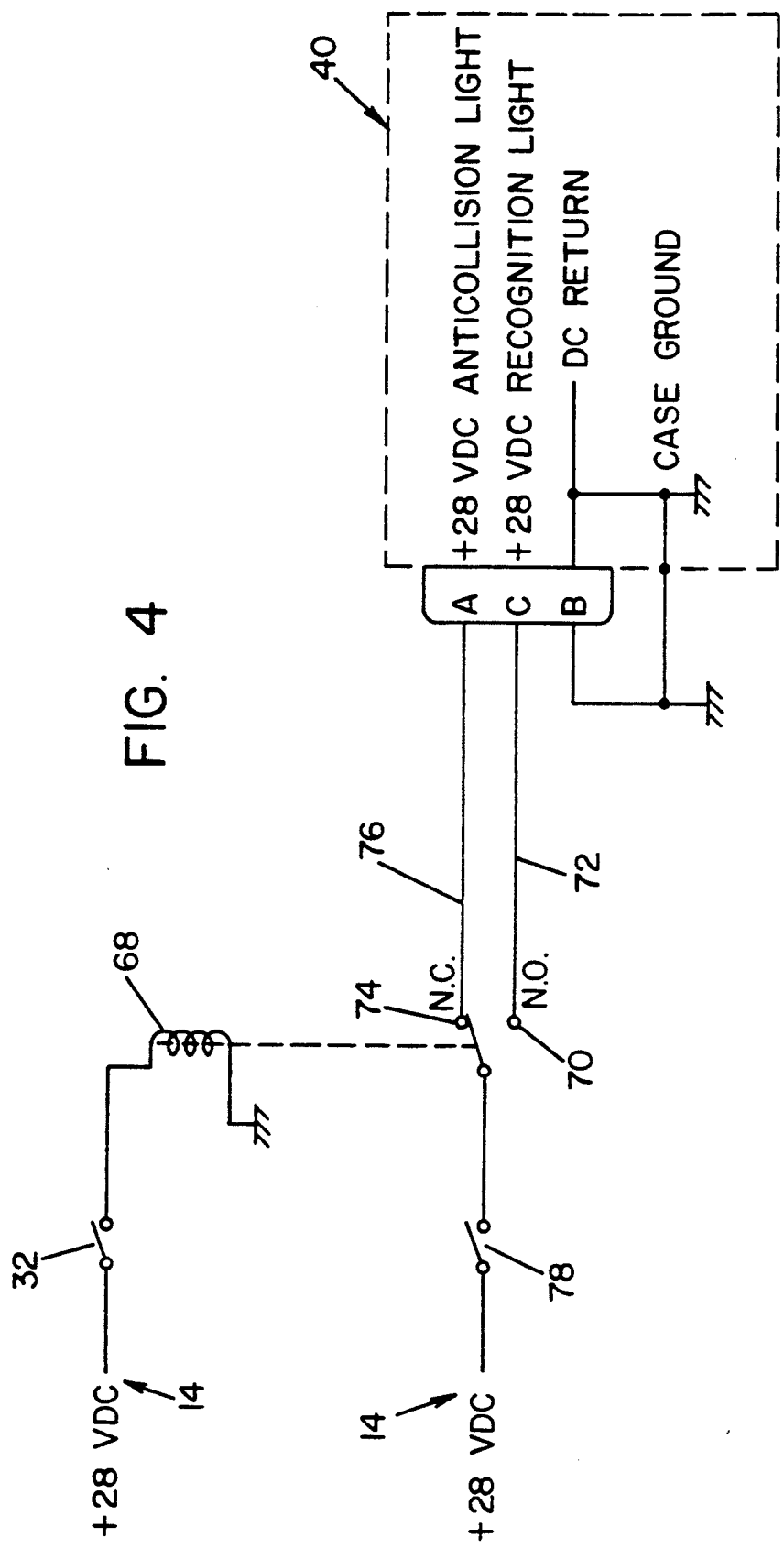
FIG. 4 is a schematic diagram of the electrical connection from a landing gear position switch to the circuit of FIGS. 3A, 3B.

As shown in FIG. 4, the landing gear position switch 32 functions to activate a relay 68. When the relay is energized, the normally open contacts 70 close connecting +28 VDC system power to the "RECOGNITION" signal line 72. When the relay 68 is de-energized the normally closed contacts 74 connect +28 VDC system power to the "ANTICOLLISION" signal line 76. If desired, a master override switch 78 can be connected in series between system power and the relay contacts 70,74 to permit the flight crew or other operator to disengage the lamp system from operating in response to the landing gear switch 32. The relay can be configured to switch from normally closed to normally open as the plane becomes airborne, or when the plane touches down, the difference simply requiring a change in which signal line is connected to the normally open and normally closed contacts. Conveniently, in the preferred embodiment, the output signals from the relay 68 also provide the system power input to the lamp 40.

Referring again to FIGS. 3A, 3B, the anticollision switch circuit 24 includes an SCR Q3 triggered from a conventional RC timing circuit (R28 and C14). A PNP switching transistor 80 (Q5) is connected in parallel with the timing capacitor C14 and is controlled by the RECOGNITION light signal from the landing gear switch and relay circuit. Thus, when the recognition light 20 is selected to be illuminated when the aircraft is on the ground, transistor Q5 conducts and prevents operation of the anticollision SCR Q3. In a similar manner, the recognition switch circuit 26 includes an SCR Q7 triggered from a conventional RC timing circuit (R38 and C17). A PNP switching transistor (Q6) is connected in parallel with the timing capacitor C17 and is controlled by the ANTICOLLISION light signal from the landing gear switch and relay circuit. Thus, when the anticollision light 18 is selected to be illuminated due to the plane being airborne, transistor Q6 conducts and prevents operation of the recognition SCR Q7. The switching circuits 24,26 are also responsive to the flash pulse timer circuit 28. This circuit produces approximately 50 pulses per minute, although other flash rates can of course be used.

When the SCRs Q3 and Q7 are triggered, they respectively apply trigger pulses to pulse transformers 2T1 and 2T2 which in turn pulse respectively the anticollision light 18 and the recognition light 20. Again, the circuit of FIG. 3 can easily be modified to permit alternate flashing of the anticollision light and recognition light when the aircraft is airborne or alternatively on the ground, or both. SCR switching circuits are but one of many available designs for switching activation of the lights 18,20.

The invention thus provides in the preferred embodiment a self-contained exterior safety lamp for an aircraft that includes an anticollision light of higher intensity for airborne operation and a recognition light of lower effective intensity when the aircraft is on the ground. This dual mode lamp is preferably responsive to a landing gear switch that indicates when the aircraft is airborne and on the ground and the lamp can switch modes automatically in response to the landing gear switch.

Although the invention has been shown and described with respect to certain preferred embodiments, it is apparent that equivalents and modifications will occur to others skilled in the art upon the reading and understanding of the specification. The present invention includes all such equivalents and modifications, and is limited only by the scope of the following claims.

What is claimed is:

1. An exterior light system for an aircraft comprising first and second lamp means; switching means for indicating when the aircraft is airborne and when the aircraft is on the ground and providing a status signal indicative thereof; and activating means responsive to said status signal for activating said first lamp means when the aircraft is airborne and said second lamp means when the aircraft is on the ground.

2. The system according to claim 1 wherein said activating means comprises pulse timer means for pulse activation of said lamp means.

3. The system according to claim 1 wherein said switching means comprises a landing gear switch actuated by the aircraft's load on the landing gear.

4. The system according to claim 3 further comprising override means for enabling a crew member to manually disengage said activating means.

5. The system according to claim 1 wherein said first lamp means comprises an anticollision light and said second lamp means comprises a recognition light.

6. The system according to claim 5 wherein said first lamp means can radiate at least 400 candela.

7. The system according to claim 6 wherein said second lamp means radiates less than 400 candela.

8. The system according to claim 7 wherein said first and second lamp means comprises respective lights that can radiate at least 400 candela, said second lamp means further comprising a color filter.

9. The system according to claim 1 wherein said first and second lamp means are mounted within a common housing.

10. The system according to claim 9 wherein each of said lamp means comprise a light and a capstan reflector, said capstan reflectors being axially aligned within said housing.

11. The system according to claim 2 wherein said activating means further comprises an SCR switch means for each of said lamp means.

12. The system according to claim 11 wherein each of said SCR switch means is responsive to said pulse timer means and said switching means.

13. The system according to claim 12 wherein said activating means alternately activates said first and second lamp means when the aircraft is airborne and activates said second lamp means when the aircraft is on the ground.

14. The system according to claim 12 wherein said first and second lamp means are activated in a mutually exclusive manner with respect to each other.

15. A dual mode exterior lamp for an aircraft comprising first and second lights, each of said lights being positioned on a respective reflector; said reflectors being axially aligned within a common housing; and means for activating one of said lights when the aircraft is airborne and the other of said lights when the aircraft is on the ground.

16. The lamp according to claim 15 wherein said first light is an anticollision light and said second light is a recognition light.

17. The lamp according to claim 16 wherein said lights radiate at least 400 candela white light and one of said lights has a color filter such as red on its respective reflector, said reflectors being capstan reflectors.

18. A dual mode exterior lamp for an aircraft comprising an anticollision light, a recognition light, a power supply for said lights, and switching means for activating said anticollision light when the aircraft is airborne and for activating said recognition light when the aircraft is on the ground in mutually exclusive manner with respect to one another, wherein said switching means is responsive to an automatically generated signal that indicates when the aircraft is airborne and when the aircraft is on the ground.

19. The lamp according to claim 18 wherein said anticollision light radiates at least 400 candela and said recognition light is color filtered to radiate less than 400 candela.

20. The lamp according to claim 19 wherein said signal is provided as an input to the lamp from a landing gear switch responsive to the aircraft's load.

21. The lamp according to claim 20 wherein said activating means flashes said lights at about fifty (50) flashes per minute.

22. The lamp according to claim 21 wherein said lights are activated mutually exclusive with respect to each other.

23. The lamp according to claim 21 wherein said activating means alternately activates said lights when the aircraft is airborne and activates said recognition lamp alone when the aircraft is on the ground.

24. A method for providing safety lighting on an aircraft exterior comprising the steps of:
 a) providing a dual mode lamp having an anticollision light and a recognition light;
 b) providing a detection means to detect whether the aircraft is airborne or on the ground and provide a status signal indicative thereof;
 c) selectively emitting light from said anticollision light in response to said status signal indicating the aircraft is airborne; and,
 d) selectively emitting light from a recognition light in response to said status signal indicating the aircraft is one the ground.

25. The method of claim 24 wherein step b) comprises emitting a light intensity of at least 400 candela and step c) comprises emitting light at less than the intensity of the light emitted in step b).

26. The method of claim 25 wherein the step of supplying power to the lamp comprises the step of using said signal also as a supply source.

* * * * *